March 26, 1935.                C. B. CLARK                  1,995,293
                          PROCESS OF GAS TREATMENT
                      Filed Nov. 18, 1932      2 Sheets-Sheet 2
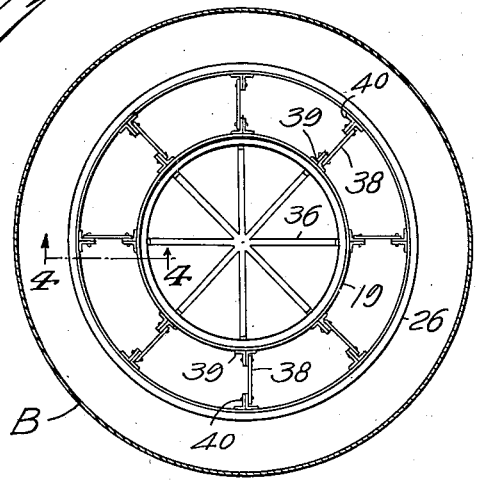
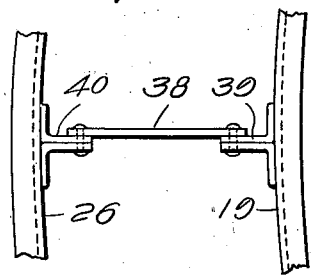
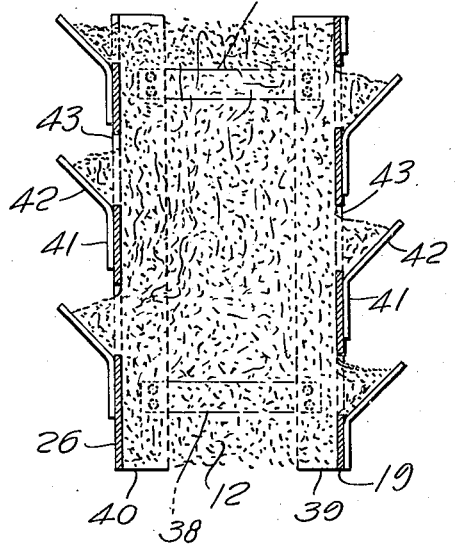
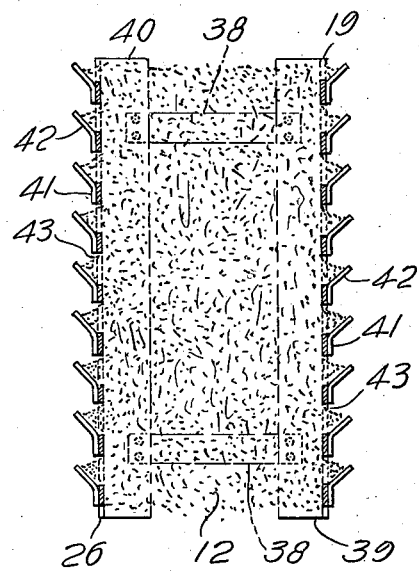
INVENTOR.
CYRIL B. CLARK,
BY
ATTORNEY.

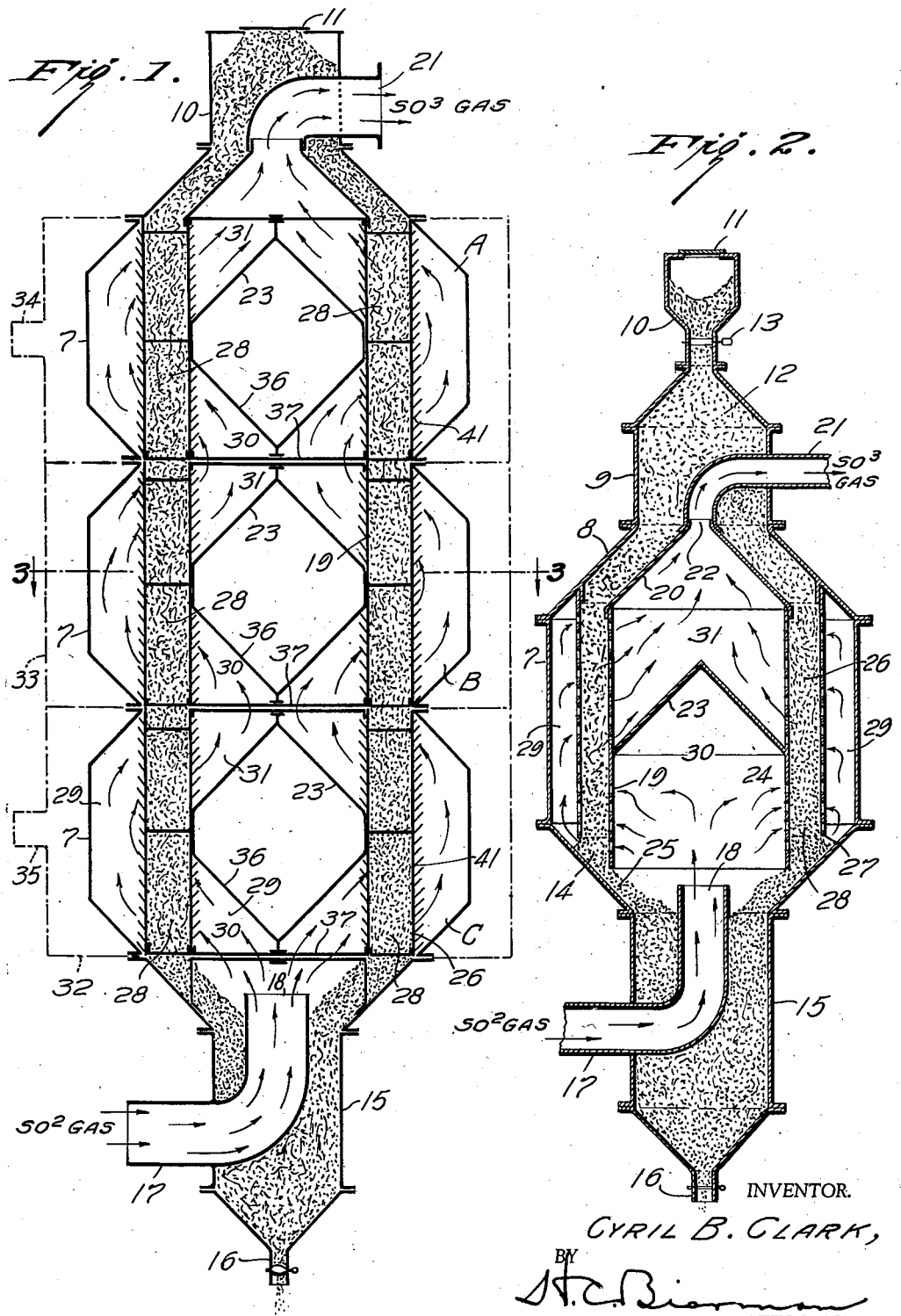

Patented Mar. 26, 1935

1,995,293

UNITED STATES PATENT OFFICE 1,995,293

PROCESS OF GAS TREATMENT

Cyril B. Clark, Scarsdale, N. Y., assignor, by mesne assignments, to American Cyanamid & Chemical Corporation, a corporation of Delaware Application November 18, 1932, Serial No. 643,174

8 Claims. (Cl. 23—176)

My invention relates to improved processes for the treatment of gases and is particularly applicable to the manufacture of sulphuric acid by the catalytic oxidation of sulphur dioxide to sulphur trioxide and includes a particularly efficient method of passing make-up gases through a self-cleaning converter for catalytic reactions. This is particularly advantageous when used in the manufacture of sulphuric acid with non-poisoning vanadium catalysts such as are described in United States Patent No. 1,675,308 of June 26, 1928, and No. 1,694,123 of December 4, 1928, although other types of catalyst may be advantageously used according to the present method.

It is well-known that the conversion of sulphur dioxide containing gases derived from the ore burners, to sulphur trioxide at various temperatures, depends largely on the relations between the percentage conversion obtained and the length of time the gas is brought in contact with the catalyst. As the reaction progresses a longer time of contact with the catalyst is required for each percent of conversion obtained. For example, at 400° C. if one unit of time is required to obtain 50% conversion, about four units of time will be required to obtain 80% conversion, ten units of time for 94% conversion; and twenty units of time for 96% conversion.

I have discovered an improved and economical method for such catalytic oxidation of sulphur dioxide by decreasing gradually the velocity of the gas through the catalyst mass, and thus gradually increasing the time contact of the gas with the catalyst, while cooling the gas exteriorly, which procedure will result in marked improvements in the conversion to sulphur trioxide obtainable.

In my improved methods the gas stream passes at least twice through the catalyst mass in the converter which is specially designed to force the gas back and forth through the catalyst bed in opposite directions, such catalyst bed being disposed preferably in annular form concentrically within the converter shell which may be cooled by controlled circulation of air, exteriorly of the shell if desired. My improved converter is especially designed to carry out the various novel steps in this process for the economical manufacture of sulphuric acid, and other processes as hereinafter set forth.

My converter and method as herein shown and described also combines novel means and methods for automatically collecting the dust and fume from the gases outside the screens as they pass through the catalyst bed, which dust and fume are collected in the bottom of the converter and may be removed along with the dirty catalyst as required.

The gas velocity is highest as the gas first enters and penetrates the catalyst, and lowest as the gas leaves the catalyst mass. Hence I advantageously control the gas velocity as well as the time contact by decreasing the velocity of the gas in and through the catalyst while prolonging the contact between the gas and catalyst necessitated by the reaction which may be applied to any catalytic reaction whether exothermic or not.

Furthermore, to obtain the maximum efficiency from the catalyst in oxidizing sulphur dioxide to sulphur trioxide, the temperature of the gas in contact with the catalyst should preferably gradually decrease from the point where the gas first enters the catalyst to the point where the gas passes out of the catalyst. As the reaction progresses, heat is generated in proportion to the $SO_2$ converted to $SO_3$. Since the major portion of the reaction will occur with a comparatively small amount of catalyst, the greater part of the heat of reaction will be developed at or near the point where the gas enters the catalyst.

As applied to catalytic procedures other than the conversion of $SO_2$ to $SO_3$, my improved process has exactly the same advantages as above recited for the manufacture of sulphuric acid.

The invention is particularly desirable wherever it is found necessary to remove dust and/or fume from the gases, whether such gases are going to catalysis or not. Obviously the invention is not to be restricted to the use of a catalyst mass but should be construed as including any gas treating material whether of a catalyst nature or of a purely filtering type.

In the drawings—

Fig. 1 is a sectional elevation somewhat in diagrammatic form of a plurality of assembled sections of my improved apparatus shown more in detail in Fig. 2, and as applied to a converter for the treatment of $SO_2$.

Fig. 2 is a sectional elevation of a single unit.

Fig. 3 is a detailed view taken on the line 3—3 of Fig. 2.

Fig. 4 is an enlarged detail view taken on the line 4—4 of Fig. 3.

Fig. 5 is a detailed view of braces for the screens shown in Fig. 3.

Fig. 6 is an enlarged view showing a modified form of vane structure shown in Fig. 4.

Referring to Fig. 2 showing a single unit converter, the cylindrical shell 7 supports the dome-shaped cover 8 which carries the cylindrical shell 9 upon which is mounted the catalyst bin 10 having the lid 11. Catalyst material 12 passes by gravity from the bin 10 through the gate 13 into the shell 9. Below the shell 7 is secured the inverted dome-shaped bottom 14 (similar in form to the cover 8) to which is fastened the inverted dome-shaped container 15 for the dirty catalyst and dust, having the outlet 16.

The $SO_2$ gas inlet 17 connected with the burners (not shown) enters the container 15 and has its outlet port 18 concentrically disposed in the converter proper. The inner perforated screen 19, preferably in cylindrical form, is fastened at the top to the lower rim of the conical plate 20 carried by the outlet pipe 21 for the $SO_3$ gas which is fastened to the shell 9. The plate 20 has the orifice 22 formed in its top, which orifice is connected with the lower end of the outlet pipe 21 as shown.

The conically shaped solid plate 23 having the depending skirt 24 is fastened to the screen 19 preferably around the middle portion thereof, and the lower rim of such screen 19 is cut off to provide an annular passage 25 for the catalyst material to pass downwardly between the bottom 14 and the screen 19.

Concentrically surrounding the screen 19 is the outer perforated screen 26 fastened to the cover 8 and with the lower rim 27 spaced from the bottom 14 adjacent from the bottom of the shell 7. The annular space between the screens 19 and 26 provides the active catalyst bed 28 containing the catalyst 12. The annular compartment 29 between the outer shell 7 and the outer screen 26 forms a gas passage for reversing the gas stream from the lower chamber 30 below the plate 23 to the upper chamber 31 communicating with the outlet pipe 21.

In the operation of this converter according to my improved methods, the $SO_2$ gas enters through the pipe 17 into the chamber 30 where it is preheated and then passes through the lower part of the catalyst bed 28 into the compartment 29 where it is cooled; then the gas passes inwardly through the upper part of the catalyst bed 28 into the upper chamber 31 and is finally discharged through outlet pipe 21. The arrows in Fig. 2 show the path of the gas alternately in opposite directions through the converter. Clean catalyst in the bin 10 is drawn as required into the bed 28 between the screens 19 and 26, and is discharged through the outlet 16. All dust collected in the compartment 29 and chamber 30, as well as in the catalyst bed 28, is discharged with the catalyst through the outlet 16, while dust collecting on the plate 23 passes into the catalyst bed 28. The plate 23 and skirt 24 prevent the gas short circuiting the catalyst.

The gas entering through the pipe 17 is preferably heated to a temperature of 700° F. and will be further heated to around 900° F. in the chamber 30 as it first passes into the catalyst bed 28, the gas gradually cooling as it leaves through the outlet pipe 21 to about 750° to 800° F. In the converter shown and as hereinbefore described, the dust and fume is practically removed from the $SO_3$ gas issuing from the pipe 21 and such gas may be passed into the usual absorbers (not shown) where an absorption of the gas from 95% to 98% may be obtained.

In Fig. 1, three separate sections A, B and C, substantially like the single unit converter shown in Fig. 2, are superposed, in which the gas stream passes six times through the common catalyst bed 28 before passing out of the converter unit A through the outlet 21. The amount of catalyst in the separate units may be varied at will so as to provide a free passage for the gas stream in reverse direction from the compartments 29 to the chambers 31. Since the general structure of these units A, B and C is substantially similar to the single unit shown in Fig. 2 and already set forth in detail, it will only be necessary to describe the additional features of construction shown in Fig. 1 and also in detail in Figs. 3 and 6.

As shown in Fig. 1, the outer casing 32 surrounds the units A, B and C joined together to provide a cooling chamber 33 through which air is passed from the pipe 34 and is removed through the pipe 35 as indicated by allows, whereby the outer shells 7 of the successive units A, B and C are cooled to gradually cool the rising gas stream within as it is alternately removed through the catalyst bed 28.

As shown in Fig. 3, I have provided a series of brace members 36 (eight being shown in Fig. 3) radiating from the center of the cross bars 37 at the bottom of each unit A, B and C. The upper ends of the brace members 36 are fastened to the skirts 24 to hold the inner screens 19 in position.

As shown in Figs. 3 and 5, the screens 19 and 26 are held in concentric position to provide the catalyst bed 28 of substantially uniform thickness by means of a series of plates 38 riveted to the brackets 39 and 40 fastened to the screens 19 and 26 respectively.

Referring to Figs. 1, 4 and 6, I have provided novel means and methods for collecting dust and fume from the compartments outside of the perforated screens 19 and 26 and returning the same to the catalyst bed 28 for subsequent removal. Such means comprise annular vanes 41 fastened to the solid parts of the screens having faces 42 upwardly inclined to partly close the openings 43 cut in the screens 19 and 26. In the Fig. 4 construction the vanes 41 are horizontally disposed, while in Fig. 6 the arrangement is staggered. In both figures a part of the catalyst projects through the openings 43 and rests on the vanes 41, and the dust is collected on the faces 42 which are suitably inclined to permit the dust to mingle with the catalyst and sift through the catalyst bed 28 to be discharged through the outlet 16 as in the Fig. 2 converter.

In the operation of the multiple converter shown in Fig. 1, the gas stream enters the inlet 17 and alternately passes through the catalyst bed 28 in opposite directions in each unit A, B and C, the arrows indicating the approximate paths of the gas as it rises through the converter, the $SO_3$ gas finally passing out of the outlet pipe 21 as in the Fig. 2 construction. Meanwhile the gas stream is advantageously cooled by the surrounding air jacket in the chamber 33 with cooling air entering the pipe 34 and passing out of the chamber 33 through the pipe 35.

In both Fig. 1 and Fig. 2 converters, the velocity of the gas stream is gradually diminished as the gas stream passes upwardly, thereby increasing the time contact of the gas with the catalyst, while such gas stream is advantageously cooled in the compartments 29.

While the specific embodiment of the invention has been shown and described with particular reference to the conversion of $SO_2$ to $SO_3$, yet it is to be distinctly understood that the invention contemplates the use of substantially the same apparatus and method for the synthetic production of ammonia, methanol, or other organic synthesis, substituting for the SO₃ catalyst a catalyst appropriate to the synthesis being conducted. These synthetic reactions may be exothermic or not, as the case may be.

The apparatus and method may, of course, have a double use, that is, for filtering or gas cleaning as well as catalysis, or the apparatus and method may be limited to either one of these features.

I claim:

1. A method of simultaneously conducting an exothermic catalytic reaction and the removal of dust or the like from the gases undergoing catalysis which comprises passing such dust-laden gases back and forth in alternate directions through a body of catalyst material to simultaneously remove the dust from said gases and to subject said gases to catalysis and alternately decreasing and increasing the gas velocity through the catalyst mass, and subjecting the gas to the action of a cooling medium between at least some reversals of direction of flow and subsequently removing said dust.

2. The method of claim 1 with the additional step of simultaneously removing spent or dirty catalyst material with the deposited dust.

3. The method of claim 1 with the additional steps of feeding fresh catalyst and simultaneously removing spent or dirty catalyst and deposited dust.

4. In the manufacture of sulphuric acid by catalytic oxidation of sulphur dioxide containing gases, the step which comprises causing the gas stream to pass alternately back and forth in opposite directions through a catalyst mass while alternately decreasing and increasing the gas velocity and cooling the gases between a change of directional flow.

5. In the manufacture of sulphuric acid by the catalytic oxidation of sulphur dioxide containing gases, the step which comprises causing the gas stream to assume alternately an increasing and decreasing cross-sectional area while passing alternately in opposite directions through the catalyst and subjecting the gas to the action of a cooling medium between at least some reversals of direction of flow.

6. In the manufacture of sulphuric acid by the catalytic oxidation of sulphur dioxide containing gases, the step which comprises causing the gas stream to assume alternately an increasing and decreasing cross-sectional area while passing alternately in opposite directions more than twice through the catalyst and subjecting the gas to the action of a cooling medium between at least some reversals of direction of flow.

7. In the manufacture of sulphuric acid by catalytic oxidation of sulphur dioxide containing gases to sulphur trioxide, the steps which comprise passing a mixture of SO₂ and oxygen containing gases into a radiantly heated zone to raise the gas temperature to a catalytic operating point, passing said heated gas through a catalytic mass with decreasing velocity, thereafter cooling the resultant mixture, passing said mixture in an opposite direction through a catalyst mass with increasing velocity, and venting the resultant product.

8. The method of claim 7 in which the gas is passed through a catalyst mass at least six times in alternate directions.

CYRIL B. CLARK.